(12) United States Patent
Kinsley et al.

(10) Patent No.: US 6,605,015 B1
(45) Date of Patent: Aug. 12, 2003

(54) TUNABLE CLUTCH FOR AXLE ASSEMBLY

(75) Inventors: Gerald L. Kinsley, Fort Wayne, IN (US); Gregory L. Heatwole, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/799,719

(22) Filed: Mar. 7, 2001

(51) Int. Cl.[7] .............................................. F16H 48/20
(52) U.S. Cl. ...................................... 475/86; 192/103 F
(58) Field of Search ............................. 475/86, 88, 206, 475/89, 198, 295; 192/103 F, 103 FA, 109 F

(56) References Cited

U.S. PATENT DOCUMENTS

| | | | |
|---|---|---|---|
| 3,352,395 A | * 11/1967 | Hilpert | ................ 192/103 FA |
| 3,653,279 A | * 4/1972 | Sebern | ........................ 475/86 |
| 3,851,739 A | 12/1974 | Scheider et al. | |
| 3,894,446 A | 7/1975 | Snoy et al. | |
| 5,611,746 A | 3/1997 | Shaffer | |
| 5,644,916 A | * 7/1997 | Hayasaki | ................ 192/109 F |
| 5,704,863 A | * 1/1998 | Zalewski et al. | ............. 475/88 |
| 6,001,040 A | * 12/1999 | Engle | .......................... 475/86 |
| 6,076,646 A | 6/2000 | Burns | |
| 6,095,939 A | * 8/2000 | Burns et al. | .................. 475/86 |
| 6,305,515 B1 | * 10/2001 | Heidenreich et al. | .... 192/103 F |

* cited by examiner

Primary Examiner—Christopher P. Schwartz
Assistant Examiner—Melanie Torres
(74) Attorney, Agent, or Firm—Liniak, Berenato & White

(57) ABSTRACT

A novel arrangement of a limited slip differential assembly comprising a differential case housing a friction clutch assembly provided within a differential case for selectively restricting differential action and a hydraulic actuator assembly including a piston assembly and a bi-directional gerotor pump. The piston assembly includes a hydraulic piston disposed in a piston housing forming a pressure chamber. The piston housing is provided with a removable bleed plug defining a flow restricting bleed passage. The bleed plug is accessible from the outside of the differential assembly without disassembling thereof through an access hole in the differential case. By appropriately selecting a flow area of the bleed passage, the limited slip differential assembly may be tuned to define application rate of torque transfer of the friction clutch assembly.

18 Claims, 3 Drawing Sheets

TUNABLE CLUTCH FOR AXLE ASSEMBLY

BACKGROUND OF THE INVENTION

1. Field of the Invention

The present invention relates to an axle assembly, and more particularly to a device for tuning a hydraulically actuated clutch assembly in the axle assembly.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces, is well known.

A number of methods have been developed to limit wheel slippage under such conditions. Prior methods of limiting slippage between the side gears and the differential case typically use a friction clutch assembly between the side gear and the differential case. The frictional clutch is usually actuated by a hydraulic actuator including a hydraulic pump and a piston assembly including a hydraulic piston applying a compressive clutch engagement force to the frictional clutch assembly. The limited slip differential having the hydraulic clutch actuator needs to be tuned (or calibrated) in order to achieve desired application rate of torque transfer of the friction clutch assembly. Currently, tuning of the limited slip differential is achieved by providing a bleed groove of an appropriate cross-section in the piston. In order to adjust the differential tuning, the differential is disassembled and the piston is replaced to a new one with the bleed groove having different cross-section providing desired tuning.

Thus, the limited slip differentials of the prior art are not readily tunable, and the tuning procedure of the current limited slip differentials requires removing, disassembling and rebuilding thereof with the new hydraulic piston. This method is cumbersome, laborious and time consuming.

SUMMARY OF THE INVENTION

The present invention provides an improved readily tunable hydraulically controlled limited slip differential assembly permitting simple and quick tuning thereof without disassembling.

The differential assembly in accordance with the preferred embodiment of the present invention includes a rotatable differential case, a differential gearing rotatably supported in the differential case, a pair of opposite side gears in meshing engagement with the differential gearing to permit differential rotation thereof, a friction disk clutch assembly disposed within the differential case for selectively restricting differential action, and a hydraulic actuator assembly including a piston assembly and a bi-directional gerotor pump. The friction clutch assembly includes a number of alternating outer friction plates non-rotatably coupled to the differential case and inner friction plates splined to one of two opposite output shafts each drivingly coupled to the corresponding side gear. The piston assembly includes a hydraulic piston disposed in a piston housing forming a pressure chamber. The piston housing is provided with a removable bleed plug defining a flow restricting bleed passage. The bleed plug is accessible from the outside of the differential assembly without disassembling thereof through an access hole in the differential case. By appropriately selecting a flow area of the bleed passage, the limited slip differential assembly may be tuned to define application rate of torque transfer of the friction clutch assembly.

Therefore, the limited slip differential assembly in accordance with the present invention is a novel arrangement of the limited slip differential assembly that provides easy access to a bleed plug and permits quick installation/removal thereof without disassembling of the differential assembly. The method for tuning a limited slip differential assembly in accordance with the present invention solves the need for a solution to the problem of calibrating the application rate of the transfer torque of the limited slip differential assemblies without disassembling of the differential assembly in a simple, quick, efficient and inexpensive manner.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
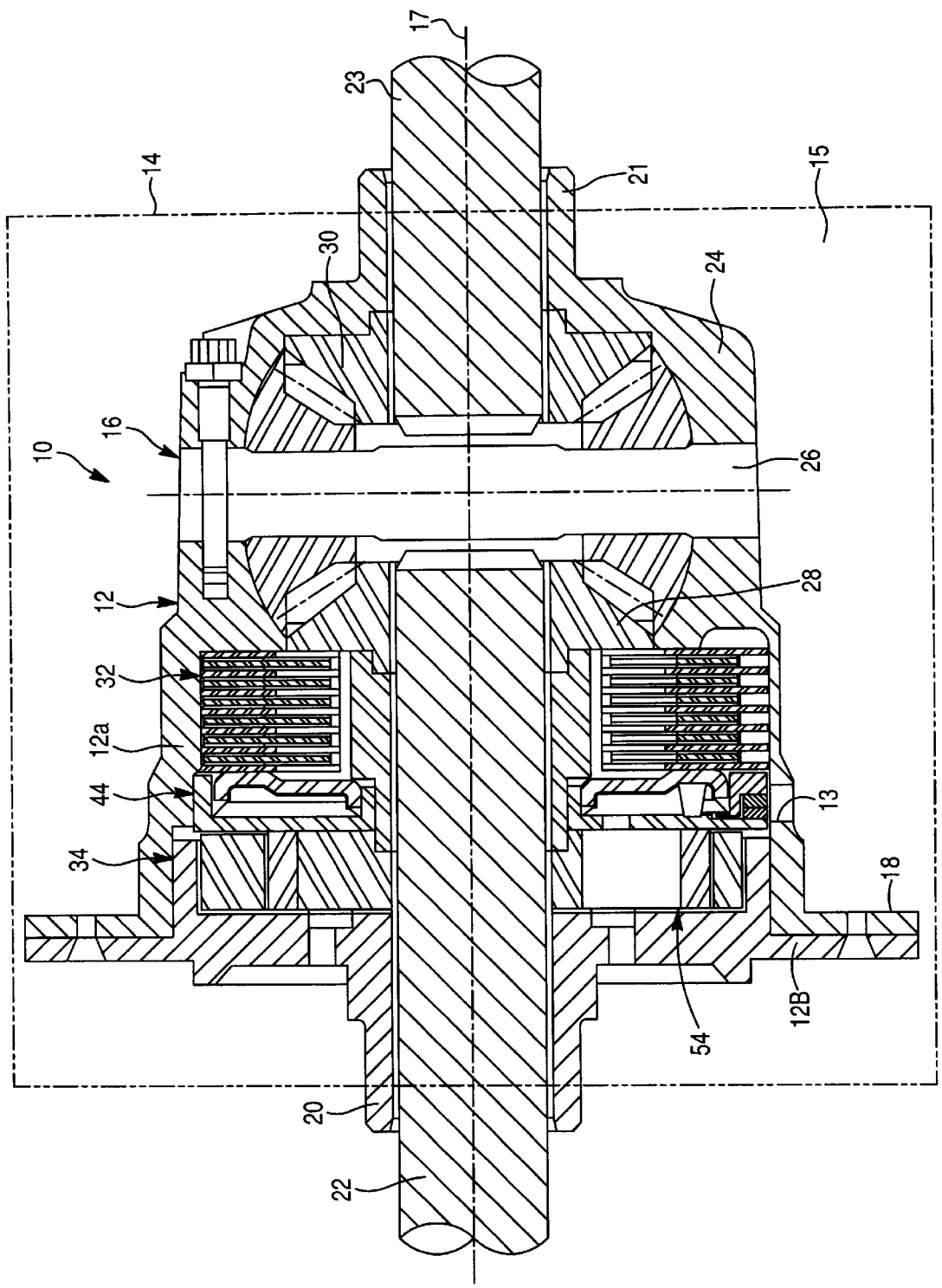
FIG. 1 is a sectional view illustrating a hydraulically actuated limited slip differential assembly of the present invention.

The present invention is directed to a torque coupling device, such as a hydraulically controlled limited slip differential (LSD) assembly indicated generally at 10 in FIG. 1 that illustrates the preferred embodiment of the present invention. The limited slip differential assembly 10 of the present invention comprises a differential case 12, which is constructed by joining case halves 12a and 12b to form a generally cylindrical structure. The differential case 12 rotatably supported in a differential housing 14 (shown only schematically) forming a differential chamber 15 containing a supply of hydraulic fluid, through roller bearings (not shown), and defines an axis of rotation 17. The differential case 12 is constructed to hold a differential gear assembly 16. The differential case 12 includes a flange 18 formed on an outer peripheral surface thereof coaxially to the axis 17 for connecting the differential assembly 10 to a driving ring gear (not shown) using conventionally known means, such as threaded fasteners (not shown). The differential case 12 also includes a hollow receiving hubs 20 and 21 on each end thereof, the hubs 20 and 21 define apertures for receiving opposite output shafts 22 and 23.

The differential gear assembly 16 is provided with a set of pinion gears 24 rotatably supported on a pinion shaft 26 secured to the differential case 12 such that the pinion gears 24 rotate with the case 12 around the axis 17. The pinion gears 24 are also adapted to rotate around the pinion shaft 26. A pair of opposite side gears 28 and 30 are axially aligned and rotatably disposed within the differential case 12 to rotate about the axis 17. The side gears 28 and 30 are splined to the opposite output axle shafts 22 and 23 correspondingly. The side gears 28 and 30 engage the pinion gears 24 such that differential rotation can be effected between the differential case 12 and the output shafts 22 and 23.

The differential case 12 is driven from a source of rotary power (not shown). The output shafts 22 and 23 are drivingly connected to a pair of wheels mounted in a well-known manner on an axle of a vehicle (also not shown). The two output axle shafts 22 and 23 are driven by the differential case 12 by way of the differential gear assembly 16 which distributes driving torque between the two output shafts 22 and 23, as is well-known in the art.

In addition, between the differential case 12 and the side gear 28 there is provided a hydraulic coupling which is responsive to differences in rotations between those output axle shafts. The hydraulic coupling comprises a clutch assembly 32 and an actuator assembly 34 operably arranged to actuate the clutch assembly 32 for automatically and progressively transferring drive torque from the faster rotating axle shaft to the slower rotating axle shaft in response to excessive speed differentiation therebetween. The actuator assembly 34 includes a piston assembly 44 and a hydraulic pump 54. Preferably, the clutch assembly 32 is a hydraulically actuated multi-plate friction clutch assembly. However, other appropriate types of hydraulically actuated clutches are within the scope of the present invention. Both the actuator assembly 34 and the clutch assembly 32 are confined within the differential case 12.

Figure 2:
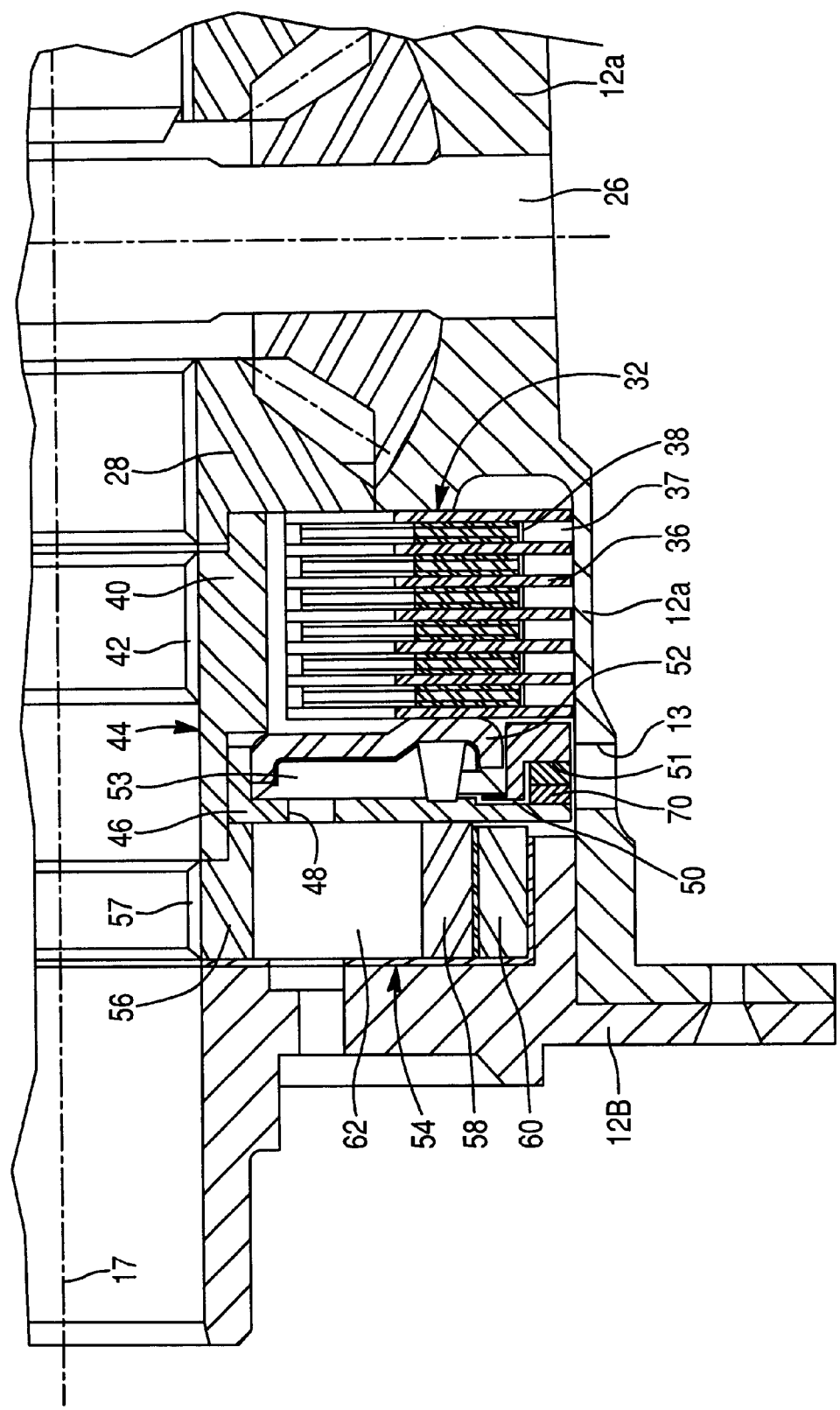
FIG. 2 is a partial sectional view of the limited slip differential assembly in accordance with the present invention.

In accordance with the preferred embodiment of the present invention illustrated in detail in FIG. 2, the hydraulically actuated multi-plate friction clutch assembly 32 is provided within the differential case 12. The multi-plate friction clutch assembly 32, well known in the prior art, includes sets of alternating outer friction discs 36 and inner friction discs 38. Conventionally, an outer circumference of the outer friction discs 36 is provided with projections that non-rotatably engages corresponding grooves 37 formed in the differential case 12. At the same time, the outer friction discs 36 are slideable in axial direction. The inner friction discs 38 are splined to a clutch hub 40 for rotation therewith. The clutch hub 40 is drivingly coupled to the output shaft, preferably via a splined connection 42.

As further illustrated in FIGS. 1 and 2, disposed within the differential case 12 is the piston assembly 44 that comprises a piston housing 46 mounted in the differential case 12 for rotation therewith, and a piston 52 disposed in the piston housing 46 forming a pressure chamber 53. The piston 52 is supported for axial sliding movement within the piston housing 46 relative to the interleaved multi-plate clutch assembly 32 for applying a compressive clutch engagement force thereon, thereby transferring drive torque from the differential case 12 to the output axle shaft 22 (via the clutch hub 40). The piston 52 may have a cover material bonded thereto, such as rubber, to provide for sealed sliding engagement with respect to inner and outer edge surfaces of piston housing 46. The amount of drive torque transferred is progressive in that it is proportional to the magnitude of a clutch engagement force exerted by the piston 52 on the clutch friction discs 36, 38 which, in turn, is a function of the fluid pressure within the pressure chamber 53.

As noted, the hydraulic pump 54 is operable for pumping the hydraulic fluid contained in the differential housing 14 into the pressure chamber 53 for actuating the multi-plate clutch assembly 32 in response to the magnitude of the differential rotation ΔRPM between the differential case 12 and the output axle shaft 22. The hydraulic pump 54 is, preferably, a rotary type bi-directional pump, such as a conventional gerotor pump, well known to those skilled in the art. It would be appreciated that any of the known types of rotary bi-directional positive displacement pumps, such as vane pump, gear pump, etc., are within the scope of the present invention.

The bi-directional gerotor pump 54 comprises an internal rotor 56 is drivingly coupled via a splined connection 57 to the output axle shaft 22 for rotation therewith, and an outer rotor 58 journally rotatably supported within an eccentric ring 60. The eccentric ring 60 is drivingly connected to the half 12a of the differential case 12. A working chamber 62 is formed between the two rotors 56 and 58. A pressure duct 48 formed in the piston housing 46, leads from the working chamber 62 to the pressure chamber 53 of the piston assembly 44. Depending upon the particular construction of the displacement pump more than one pressure ducts may be provided.

Figure 3:
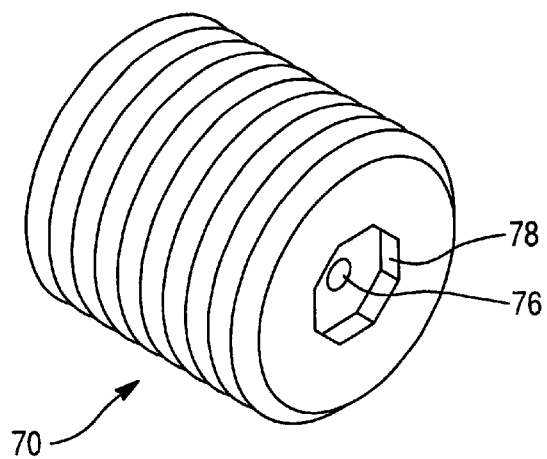
FIG. 3 is a perspective view of a bleed plug in accordance with the present invention.
Figure 4:
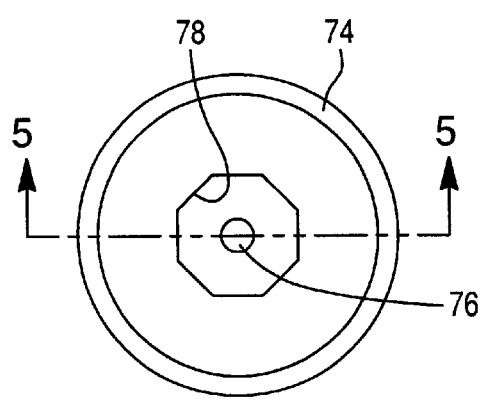
FIG. 4 is a top view of the bleed plug in accordance with the present invention.
Figure 5:
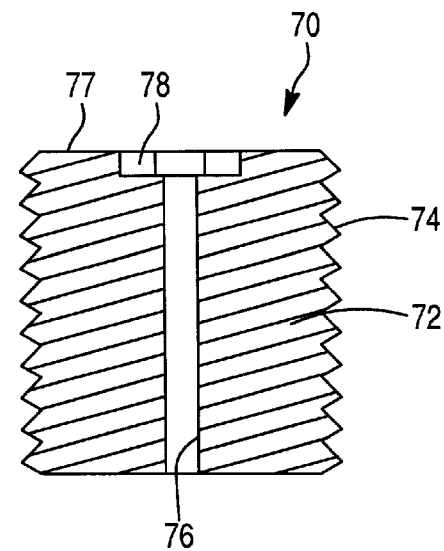
FIG. 5 is a sectional view of the bleed plug according to the present invention, taken along the line 5—5 of FIG. 4.

As further illustrated in FIG. 2, a bleed plug 70 is provided within a bore 51 formed in the piston housing 46. The bleed plug 70 defines a flow restricting bleed passage 76 (shown in FIGS. 3–5) providing a fluid communication between the pressure chamber 53 and the differential chamber 15 containing the supply of hydraulic fluid, through a communication passage 50 formed in the piston housing 46. By using the bleed plug 70, the flow restricting bleed passage 76 can be formed independently from the piston housing 46. Alternatively, it will be appreciated that the flow restricting bleed passage can be formed directly in the piston housing 46.

In operation, hydraulic fluid is drawn from the differential chamber 15 into the gerotor pump 54 when relative motion between the components of the gerotor pump 54 commences. Fluid transfers from the working chamber 62 of the gerotor pump 54 to the pressure chamber 53 of the piston assembly 44 through to the pressure duct 48. Within the pressure chamber 53, the fluid is bled back to the differential chamber 15 through the bleed passage 76 in the bleed plug 70. Once the fluid reaches the differential chamber 15, it remains there until once again drawn into the gerotor pump 54.

In accordance with the preferred embodiment of the present invention, the bleed plug 70 is removably mounted in the piston housing 46. Preferably, the bleed plug 70 is removably mounted in the threaded bore 51 in the piston housing 46. As exemplarily illustrated in detail in FIGS. 3–5, the bleed plug 70 comprises a generally cylindrical body 72 provided with threads 74 on an outer peripheral surface thereof. The flow restricting bleed passage 76 is formed through the body 72 of the bleed plug 70. The bleed plug 70 may be manufactured of any appropriate material, such as steel and plastic. The bleed plug 70 is also provided with a hexagonal counterbore 78 formed at a front end 77 thereof and adapted to be engaged with a hex (Allen) wrench (not shown) for installation or removal of the bleed plug 70. Those of ordinary skill in the art will appreciate that there are many other equivalent means that could be used for the same purpose.

Furthermore, in accordance with the present invention, the bleed plug 70 is accessible from the outside of the differential assembly 10 without disassembling thereof. In order to allow this, a generally cylindrical outer peripheral section 12a' of the differential case half 12a is provided with an access hole 13 aligned with the threaded bore 51 in the piston housing 46 that receives the bleed hole 70. The access hole 13 has a cross-section big enough to allow an installation and/or removal of the bleed plug 70.

It should be noted that the appropriate selection of a flow area (diameter) of the bleed passage 76 permits the limited slip differential assembly 10 to be calibrated (i.e., "tuned") to define particular speed differential value between the differential case 12 and the output axle shaft 22, at which torque transfer will begin (i.e., when the clamping force on the clutch discs is of a magnitude to transfer torque), and the application rate of torque transfer.

In accordance with yet another aspect of the present invention, a method of tuning (or calibrating) of the limited slip differential assembly 10 as described above, is provided. First, an LSD tuning kit is provided that includes a plurality of the bleed plugs having assorted flow area of the flow restricting bleed passage, each providing different tuning of the limited slip differential assembly 10 (i.e. the application rate of the torque transfer). Next, the limited slip differential assembly 10 is assembled while registering the access hole 13 of the differential case 12 with the threaded bore 51 in the piston housing 46. Finally, the bleed plug 70 from the plurality of the assorted bleed plugs of the LSD tuning kit having the bleed passage flow area providing the desired LSD tuning, is selected and installed in the threaded bore 51 in the piston housing 46 through the access hole 13. The differential assembly 10 may be tested thereafter. If results of the test are not satisfactory, the selected bleed plug 70 may be removed from the differential assembly 10 through the access hole 13 without disassembling the differential assembly 10. Then another bleed plug from the LSD tuning kit is installed, and the differential assembly 10 is retested. These steps may be repeated until the desired tuning of the limited slip differential assembly 10 is achieved.

Therefore, the differential assembly 10 in accordance with the present invention represents a novel arrangement of the limited slip differential assembly that provides easy access to a bleed plug and permits quick installation/removal thereof without disassembling of the differential assembly. The method for tuning a limited slip differential assembly in accordance with the present invention solves the need for a solution to the problem of calibrating the application rate of the transfer torque of the limited slip differential assemblies without disassembling of the differential assembly in a simple, quick, efficient and inexpensive manner.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque coupling device between an input shaft and at least one output shaft, said device comprising:
    a gear case rotatably supported in a housing;
    said gear case is in driving connection with said input shaft and adapted to drive said at least one output shaft;
    a hydraulically actuated clutch assembly disposed in said gear case and selectively connecting said at least one output shaft to said gear case; and
    a flow restrictor in flow communication with said hydraulically actuated clutch assembly for regulating a bleed flow from said hydraulically actuated clutch assembly to within said housing,
    wherein said flow restrictor is a bleed plug having a flow restricting bleed passage therethrough.

2. The torque coupling device as defined in claim 1, wherein said bleed plug is removably mounted in said gear case.

3. The torque coupling device as defined in claim 2, wherein said gear case has an access hole aligned with said bleed plug and providing an access to said bleed plug for installation and removal thereof without disassembling said torque coupling device.

4. The torque coupling device as defined in claim 1, wherein said clutch assembly is a friction clutch assembly.

5. The torque coupling device as defined in claim 1, further comprising an actuator assembly for actuating said clutch assembly, said actuator assembly including a hydraulic pump providing a pressurized flow of said hydraulic fluid for actuating said clutch assembly in response to relative rotation between said gear case and said at least one output shaft and a piston assembly including a piston disposed in a piston housing defining a pressure chamber supplied with said pressurized flow of said hydraulic fluid from said pump, said piston is actuatable in response to said pressurized flow of said hydraulic fluid to actuate said clutch assembly, wherein said bleed plug is removably mounted to said actuator assembly.

6. A limited slip differential assembly, comprising:
    a differential case rotatably supported within a differential housing;
    said differential case containing a differential gear assembly driven by an input shaft and allowing differential rotation between a pair of opposite output shafts;
    a hydraulically actuated clutch assembly disposed within said differential case for selectively coupling one of said output shafts to said differential case; and
    a flow restrictor in flow communication with said hydraulically actuated clutch assembly for regulating a bleed flow from said hydraulically actuated clutch assembly to within said differential housing,
    wherein said flow restrictor is a bleed plug having a flow restricting bleed passage therethrough.

7. The limited slip differential assembly as defined in claim 6, wherein said bleed plug is removably mounted in said differential case.

8. The limited slip differential assembly as defined in claim 7, wherein said differential case has an access hole aligned with said bleed plug and providing an access to said bleed plug for installation and removal thereof without disassembling said differential assembly.

9. The limited slip differential assembly as defined in claim 6, wherein said clutch assembly is a friction clutch assembly.

10. The limited slip differential assembly as defined in claim 9, wherein said friction clutch assembly includes a number of alternating inner friction discs non-rotatably coupled to at least one of said output shafts, and outer friction plates non-rotatably coupled to said differential case.

11. The limited slip differential assembly as defined in claim 6, further comprising an actuator assembly for actuating said clutch assembly, said actuator assembly including a hydraulic pump providing a pressurized flow of said hydraulic fluid for actuating said clutch assembly in response to relative rotation between said differential case and at least one of said pair of output shaft and a piston assembly including a piston disposed in a piston housing defining a pressure chamber supplied with said pressurized flow of said hydraulic fluid from said pump, said piston is actuatable in response to said pressurized flow of said hydraulic fluid to actuate said clutch assembly, wherein said bleed plug is removably mounted to said actuator assembly.

12. The limited slip differential assembly as defined in claim 11, wherein said hydraulic pump is a bi-directional gerotor pump actuated in response to a speed difference between one of said differential case and said output shafts.

13. A method for tuning a torque coupling device, said torque coupling device including a gear case rotatably supported in a housing and adapted to drive at least one output shaft, a hydraulic actuator for controllably coupling said at least one output shaft to said gear case and a removable bleed plug having a flow restricting bleed passage therethrough in flow communication with said hydraulic actuator for regulating a bleed flow from said hydraulic actuator to within said housing, said method comprising the steps of:

(a) selecting a first bleed plug from a plurality of bleed plugs having assorted flow area of said flow restricting bleed passage providing different application rates of torque transfer of said torque coupling device, said first bleed plug having said flow restricting bleed passage providing a desired application rate of torque transfer of said torque coupling device;

(b) installing said first bleed plug in said torque coupling device.

14. The method for tuning a torque coupling device as defined in claim 13, further comprising the steps of:

(c) testing said torque coupling device to determine the application rate of torque transfer of said torque coupling device;

(d) determine whether said desired application rate of torque transfer is achieved.

15. The method for tuning a torque coupling device as defined in claim 14, further comprising the steps of:

(e) replacing said first bleed plug with another bleed plug from said plurality of said bleed plugs if said desired application rate of torque transfer is not achieved; and (f) testing said torque coupling device to determine whether said desired application rate of torque transfer is achieved with said another bleed plug.

16. The method for tuning a torque coupling device as defined in claim 15, further comprising the steps of:

repeating steps (e)–(f) until said desired application rate of torque transfer is achieved.

17. The method for tuning a torque coupling device as defined in claim 13, wherein said gear case has an access hole aligned with said bleed plug and providing an access to said bleed plug for installation and removal thereof without disassembling said torque coupling device.

18. The method for tuning a torque coupling device as defined in claim 13, wherein said torque coupling device includes a friction clutch assembly.

* * * * *

UNITED STATES PATENT AND TRADEMARK OFFICE
CERTIFICATE OF CORRECTION

PATENT NO.    : 6,605,015 B1
DATED         : August 12, 2003
INVENTOR(S)   : Kinsey et al.

It is certified that error appears in the above-identified patent and that said Letters Patent is hereby corrected as shown below:

<u>Title page,</u>
Item [75], Inventor, last name, should read as follows: -- Kinsey --, Signed and Sealed this Seventeenth Day of August, 2004

JON W. DUDAS
*Acting Director of the United States Patent and Trademark Office*